United States Patent [19]
Kiesow et al.

[11] Patent Number: 5,974,272
[45] Date of Patent: Oct. 26, 1999

[54] PARALLAX CORRECTED IMAGE CAPTURE SYSTEM

[75] Inventors: Ronald H. Kiesow, Spencerport; Raymond E. Wess, Holley, both of N.Y.

[73] Assignee: Eastman Kodak Company, Rochester, N.Y.

[21] Appl. No.: 08/960,607

[22] Filed: Oct. 29, 1997

[51] Int. Cl.[6] .......................... G03B 13/20; G03B 19/18; H04N 5/225
[52] U.S. Cl. .......................... 396/140; 396/333; 348/64; 348/221; 352/137
[58] Field of Search .......................... 396/89, 322, 324, 396/325, 329, 333, 429, 323, 139, 140, 148, 149; 348/64, 220, 221; 351/131, 136, 137

[56] References Cited

U.S. PATENT DOCUMENTS

| | | | |
|---|---|---|---|
| D. 367,870 | 3/1996 | Shinano | D16/202 |
| 2,796,799 | 6/1957 | Strauss | 352/131 |
| 2,854,885 | 10/1958 | Robinson et al. | 352/131 |
| 4,488,794 | 12/1984 | Dolgow et al. | 396/333 |
| 4,829,383 | 5/1989 | Harase et al. | 348/64 |
| 4,978,983 | 12/1990 | St. Alfors | 396/89 |
| 5,173,726 | 12/1992 | Burnham et al. | 396/149 |
| 5,307,168 | 4/1994 | Tashiro | 348/64 |
| 5,329,325 | 7/1994 | McClellan et al. | 396/429 |
| 5,345,287 | 9/1994 | Taguchi | 396/378 |
| 5,381,205 | 1/1995 | Kotani et al. | 396/147 |
| 5,398,062 | 3/1995 | Hashimoto et al. | 348/334 |
| 5,436,656 | 7/1995 | Soga et al. | 348/220 |
| 5,463,438 | 10/1995 | Kosako | 396/377 |
| 5,493,353 | 2/1996 | Chen | 396/429 |
| 5,565,948 | 10/1996 | Kume et al. | 396/378 |

*Primary Examiner*—Safet Metjahic
*Assistant Examiner*—J. K. Han
*Attorney, Agent, or Firm*—Gordon M. Stewart

[57] ABSTRACT

A parallax corrected image capture system and method for capturing images using such an apparatus. The system has a first camera and a second camera, at least one of which has a variable focus objective lens the focus of which can be adjusted by a first drive. A range finder supplies a distance signal indicating the distance from the capture system to an object in a scene to be captured while a parallax corrector adjusts the angle between an optical axis of the first camera and an optical axis of the second camera. A processor system controls the first drive and the parallax corrector in accordance with the range finder distance signal.

21 Claims, 7 Drawing Sheets

PARALLAX CORRECTED IMAGE CAPTURE SYSTEM

FIELD OF THE INVENTION

This invention relates generally to the field of photography, and in particular to a system and method for capturing two images of a scene.

BACKGROUND OF THE INVENTION

Motion video cameras with built in recorders ("camcorders") are well known and popular. Such camcorders are well suited for recording motion scenes over fairly long times (e.g. up to about 2 hours). However, current camcorders have relatively low recorded picture quality due to limitations in the optical and particularly the electrical camera components (such as the sensor of the camcorder). Due to this fact, conventional still cameras using light sensitive silver halide emulsions which are chemically processed, have still retained their popularity. When a consumer wishes to obtain a high quality image of a scene the conventional still camera using a silver halide emulsion film is the medium of choice since it provides unparalleled image quality with low cost. This leads to the situation where a consumer often carries both a camcorder and a conventional film camera since he is not always aware in advance as to whether he might wish to capture a relatively lower quality motion video image, or the higher quality still photographic image.

It has been known to attach two cameras together as a combination. For example, U.S. Pat. No. 4,829,383 provides both a motion video camera and a conventional film camera in a single housing. However, since the respective lenses of the two cameras are spaced apart they do not observe a scene to be captured from the same angle. This difference in scene angle, known as parallax, is more severe the closer an object in the scene is to the two cameras. U.S. Pat. No. 4,488,794 similarly discloses two cameras attached to a common bracket. U.S. Pat. No. 4,488,794 attempts to correct parallax by providing a correcting prism which can be manually installed in front of one camera lens when close objects are to be captured, and removed when relatively distant objects are to be captured. Such additional manual attachment/removal of another piece of equipment is not appreciated by consumers. U.S. Pat. No. 5,493,353 also provides both a motion video camera and conventional still film camera in a single housing and completely avoids the parallax problem by moving the video camera sensor into the same optical path used by the still camera, when it is desired to capture motion video. However, aside from requiring assembly of a relatively complex new mechanism, the movement of the sensor into the still camera optical path prevents simultaneous capture of both motion video and still images. U.S. Pat. No. 4,978,983 provides a dual camera arrangement wherein an over-sized image sensor is used for one of the cameras, and only part of the image on the sensor which overlaps with the viewing region of the other camera, is used. This arrangement requires an expensive over-sized sensor much of the area of which is then unused. U.S. Pat. No. 5,329,325 describes a portrait camera system with two cameras on a common mount, and inter-connected zoom controls. Parallax correction is provided by a manually rotatable screw. While this system may be adequate in a portrait situation where distances to the subject being photographed remain relatively constant, it is not practical for capturing real world scenes with objects continually moving closer to and away from the cameras, thereby necessitating continual re-adjustment of the screw.

It would be desirable then, to provide a dual camera, particularly a motion video and still film camera, in one system, which provides a relatively simple method of automatic parallax correction. It would further be desirable if such a system allowed for simultaneous capture of images on both cameras, and which system could be relatively inexpensively constructed from existing components.

SUMMARY OF THE INVENTION

The present invention recognizes that many cameras are equipped with automatic focus, and that the parallax correction can be provided automatically by using the range finder information available from the automatic focus. The present invention further realizes that when the user desires to take a picture of a scene, some time may be required to obtain parallax correction once the camera system has been pointed in the direction of the scene. During this time, to avoid parallax during the capture of an image by one of the cameras (particularly the still camera), it may be desirable to prevent image capture by that camera (such as by disabling a still camera shutter).

The present invention then, provides in one aspect, a parallax corrected image capture system, comprising:
a) a first camera and a second camera, at least one of which has a variable focus objective lens;
b) an autofocus system to adjust the variable focus objective lens, having:
  a range finder to supply a distance signal indicating the distance from the capture system to an object in a scene to be captured;
  a first drive to adjust the variable focus objective lens;
  a processor to control the first drive in accordance with the range finder distance signal; and
c) a parallax corrector to adjust the angle between an optical axis of the first camera and an optical axis of the second camera based upon the distance signal obtained from the autofocus range finder.

One of the cameras may, for example, be a motion video camera while the other is a still film camera. By a motion video camera is referenced a camera which can capture motion as corresponding image signals, preferably at least at 15 (and more preferably at least 30) frames per second.

The present invention provides, in another aspect, a method of capturing two images of a scene, which method can, for example, use a camera system of the present invention. The method comprises:
a) pointing first and second cameras of a capture system toward the scene, at least one of which cameras has a variable focus objective lens;
b) using a first drive to automatically adjust the variable focus objective lens based on a distance signal from an autofocus range finder which indicates distance from the capture system to an object in the scene;
c) automatically adjusting the angle between an optical axis of the first camera and an optical axis of the second camera using based upon the distance signal obtained from the autofocus range finder.

BRIEF DESCRIPTION OF THE DRAWINGS

To facilitate understanding, identical reference numerals have been used, where possible, to designate identical elements that are common to the Figures.

DETAILED DESCRIPTION OF THE INVENTION

Figure 7:
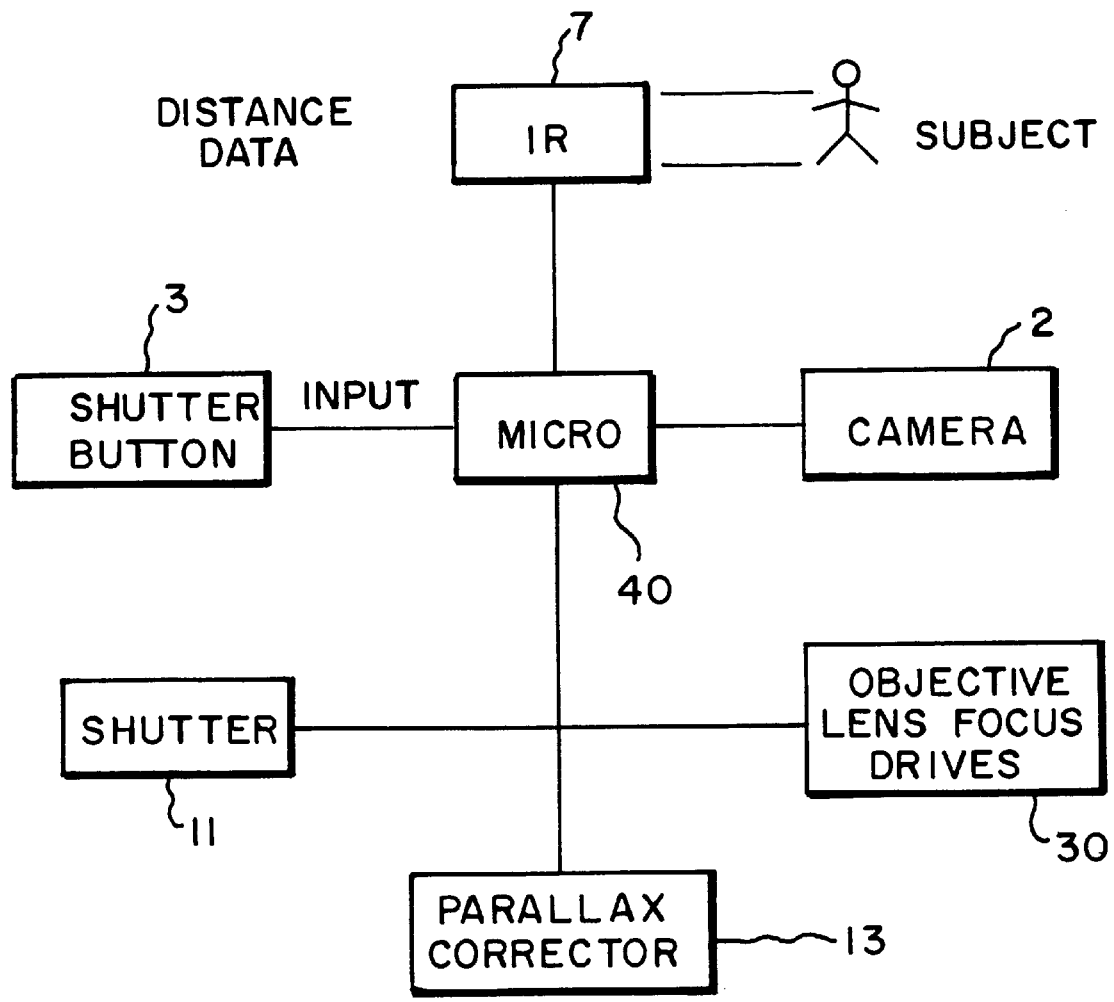
FIG. 7 is a block diagram of the components of the capture system of FIG.

Referring to the drawings, a still film camera (2), and a motion video camera (4) are mounted on a common frame 7. Frame 7 includes a shaft 6 about which still camera 2 can pivot. Still camera 2 includes a housing 2a and an objective lens system 14 mounted on the housing. As is the case for a typical camera, housing 2a is essentially light tight between the lens system 14 and a film plane at which a photographic film is positioned for exposure from the lens system 14, when the housing 2a is in a closed position shown in the drawings. Thus, light sensitive film in housing 2a is not exposed except upon opening of a camera shutter 11 (shown only schematically in FIG. 7) in a known manner. Still film camera 2 may be in the form of a conventional 35 mm or Advanced Photo System ("APS") camera, which captures one image frame at a time when a user presses a user activated capture control in the form of a shutter control button 3. Optionally, camera 2 can capture multiple image frames while shutter control button 3 is held down by a user, but in either event the still camera 2 can capture only one or more images while the user activated capture control remains activated (that is, depressed in the case of control button 3) by a user. Still camera 2 can be loaded in a known manner with a light sensitive silver halide emulsion photographic film positioned inside a housing 2a of camera 2, to receive only light passing through lens system 2a after opening of shutter 11 controlled by shutter control button 3.

Video camera 4 may be a component of a conventional video camera and video tape recorder ("camcorder") 4 contained in a single housing 4a. Motion video camera 4 has an objective lens system 16 mounted within housing 4a, as well as a sensor, such as a Charge Coupled Device sensor, to receive the image from objective lens system 16. Housing 4a is also light tight at least between lens system 16 and the sensor system (that is, the typical CCD sensor). By a motion video camera, is referenced a camera which can capture a motion scene as a signal corresponding to a series of image frames (such as at least 10 or 15 frames per second, and more preferably at least 30 frames per second). The captured motion video can be saved on the video tape recorder portion of camcorder 4. A viewfinder 22, with a front end 22a for aiming toward a scene to be captured, and an eyepiece 22b, is provided on motion video camera 4. In view of the parallax correction provided as discussed below, viewfinder 22 even though it is fixed in its angular relationship with respect to housing 4a, serves as the single viewfinder for the image capture system (that is, for both cameras 2, 4).

The objective lens system 16 of video camera 4 and the objective lens system 14 of still camera 2, are both of the variable focus and zoom type. The variable focus of objective lens systems 14, 16 are adjusted by respective first and second drives 30 (shown schematically in FIG.) under control of a processor system such as microprocessor 40. The first and second drives may be any suitable electrically activated motor and mechanical arrangement such as those in common use for autofocussing cameras. A processor may include any programmed processor (whether specific or programmed general purpose) or hard wire components, or combinations of them, which can execute equivalent steps. Microprocessor 40 is programmed so that it can carry out the required functions described in this application. Lens systems 14, 16 define respective optical axes 15, 17 of the respective cameras 2, 4, that is the axis along which light is received from a scene into the camera and onto the light sensing medium (that is, a photographic film loaded into still camera 2, and the CCD sensor in video camera 4).

Figure 6:
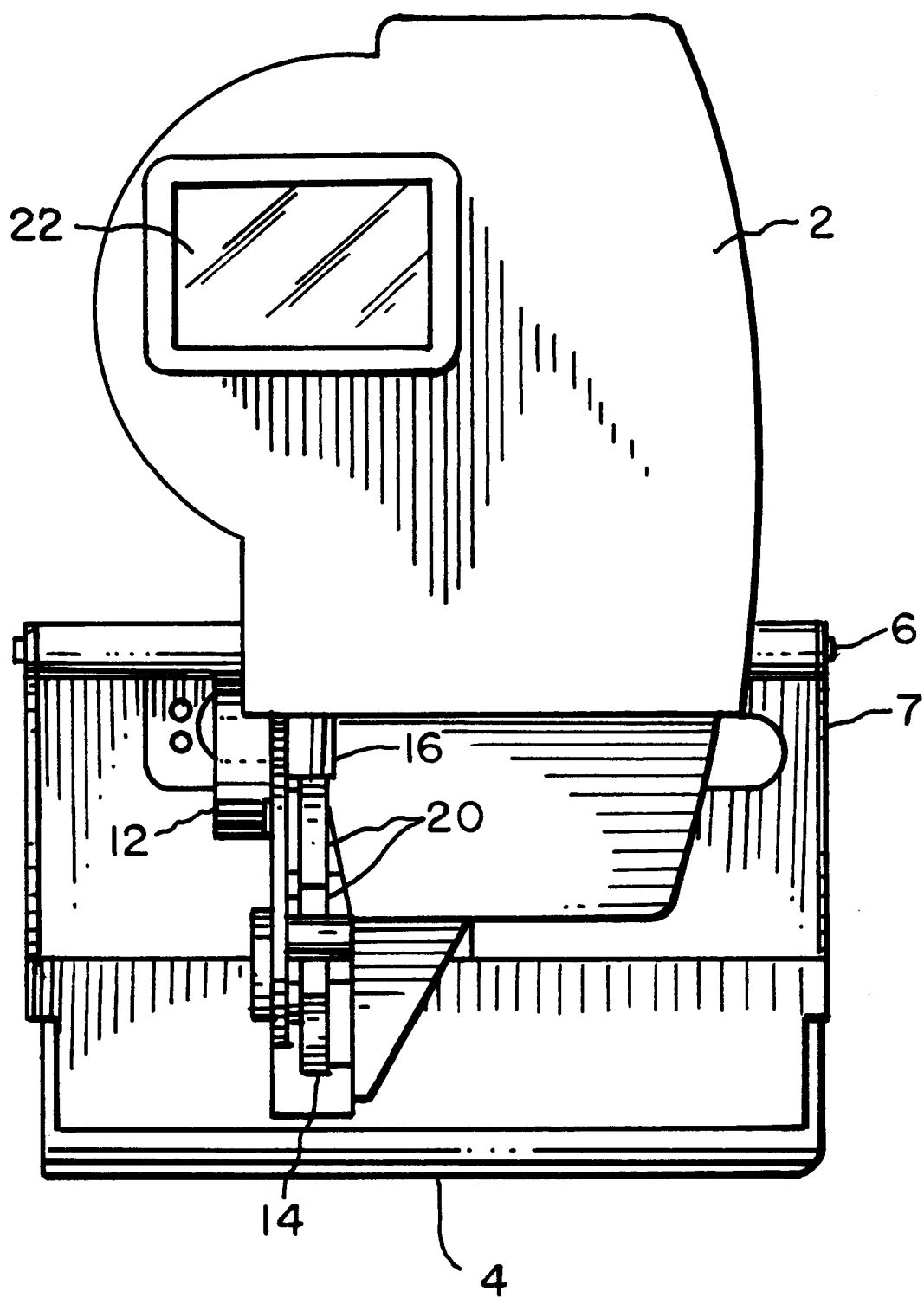

A range finder (see FIG. 6) includes an infrared emitter (8) and an infrared detector 10. Emitter 8 can emit an infrared beam continuously or only when a user depresses shutter button 3, as determined by processor 40. Detector 10 of range finder supplies a signal to processor 40 indicative of the distance from the camera system to an object in a scene to be captured. A parallax corrector 13 includes an electric stepper motor (12), a gear segment (14), drive pinion (16), and idler gears (20), can adjust the angle between camera housings 2a, 4a, and hence between the optical axes 15, 17, by causing still camera 2 to pivot about pivot about shaft 6. The parallax corrector is connected to, and is under the control of, processor 40 and can adjust the angle θ between the optical axes from an angle greater than 0 degrees (such as from 30 degrees) down to about 0 degrees. The higher angles represent capturing of scene objects relatively close to the image capture system, as illustrated for example in FIG. 3, while lower angles represent capturing scenes relatively far from the image capture system (such as the 0 degree condition of FIG. 4 where the optical axes are parallel for scene objects substantially at infinity).

In operation, a user then looks through the eyepiece 22b of common viewfinder (22), to determine the scene area to be captured. When a switch (not shown) on video camera 4 is activated by a user, this causes recording of a motion scene by video camera 4 on the built in tape recorder, until the switch is later de-activated by the user. Also, following power up of the camera system (such as by using a power switch, not shown, on video camera 4) range finder provides a signal to processor indicative of the distance to an object in the scene. Processor 40, in response to this signal, will continually adjust objective lens focus drives of both cameras 2, 4 to maintain them in focus on the main object of a scene. Additionally, processor 40 knowing the fixed distance between lens systems 14, 16 (more specifically, the distance between the optical axes 15, 17 at the lens systems 14, 16), and in response to the range finder signal, can calculate the correct angle θ between optical axes 15, 17. Processor 40, knowing the current angle between optical axes 15, 17 can then actuate parallax corrector 13 (specifically stepper motor (12) thereof) causing the drive pinion (16) and the idler gears (20) to rotate, which in turn drives the gear segment and changes the angle of the housing 2a of still camera (2) with respect to video camera 4, by pivoting it about the centering shaft (6). This changes the angle between optical axes 15, 17 until there is no parallax error between the cameras 2, 4 (thus cameras 2, 4 will have the same scenes centered on their respective image sensor systems, although they need not be, but may be, co-extensive on the respective sensor systems). Processor 40 can know the current angle between axes 15, 17 by providing processor 40 with a power up mode, such that when power is first turned on by a user of the system, processor 40 turns film camera 2 to the lowest possible angle between axes 15, 17 (preferably 0 degrees) at which point a stop (not shown) prevents still camera 2 from turning further. Processor 40 can then track any further re-positioning of still camera 2 from this known angle.

Figure 1:
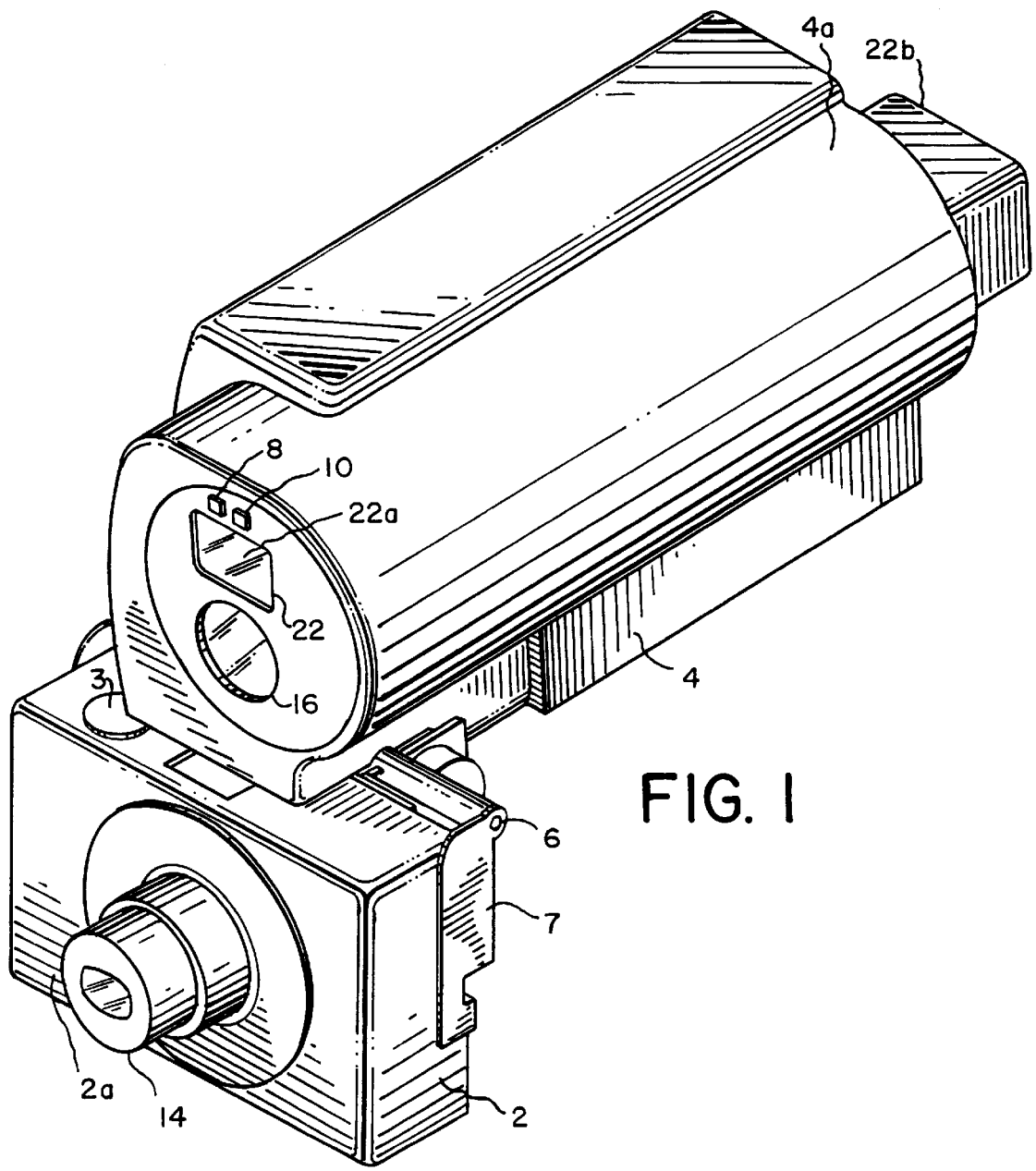
FIG. 1 is a perspective view of an image capture system of the present invention.
Figure 2:
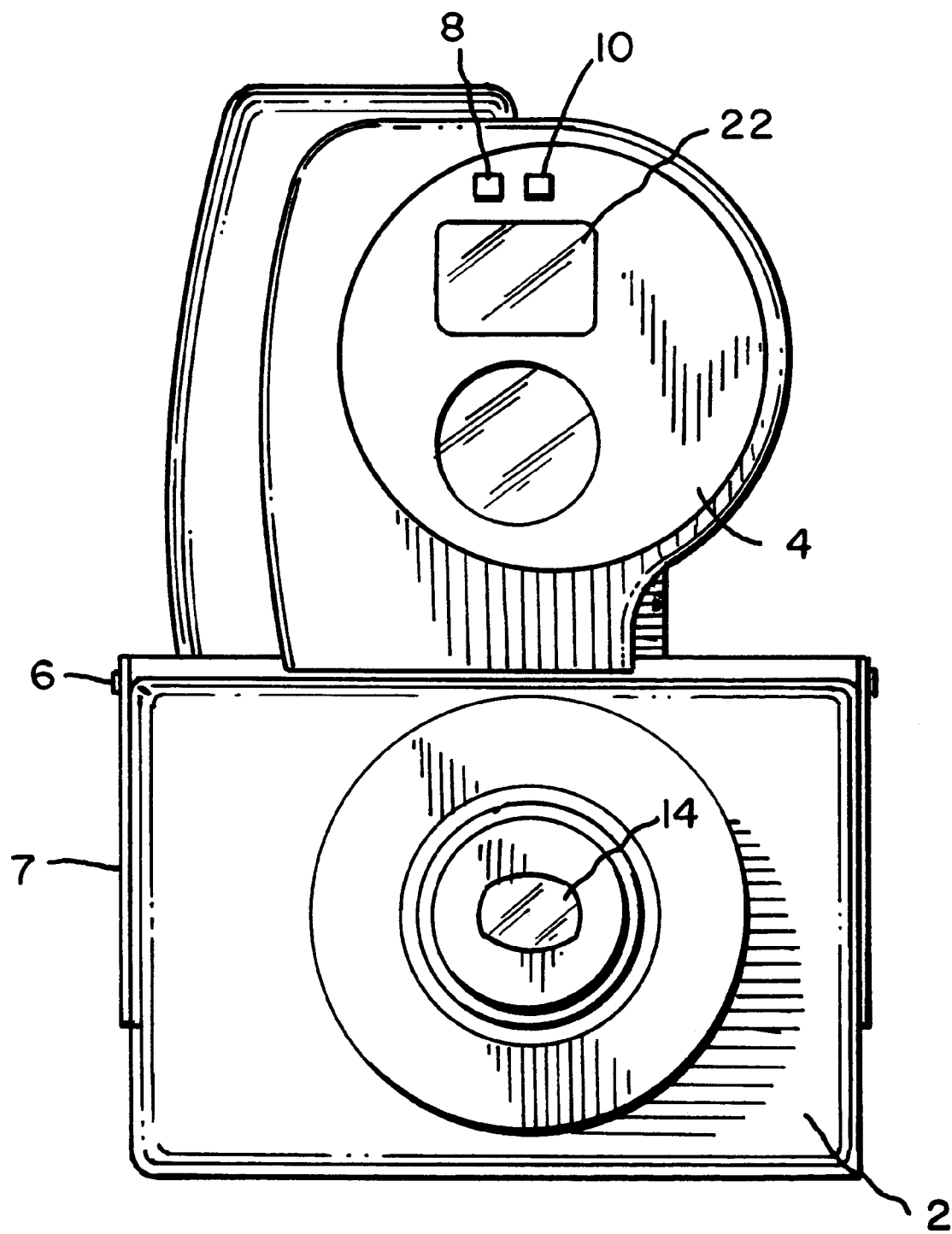
FIG. 2 is a front view of the image capture system of FIG. 1.
Figure 3:
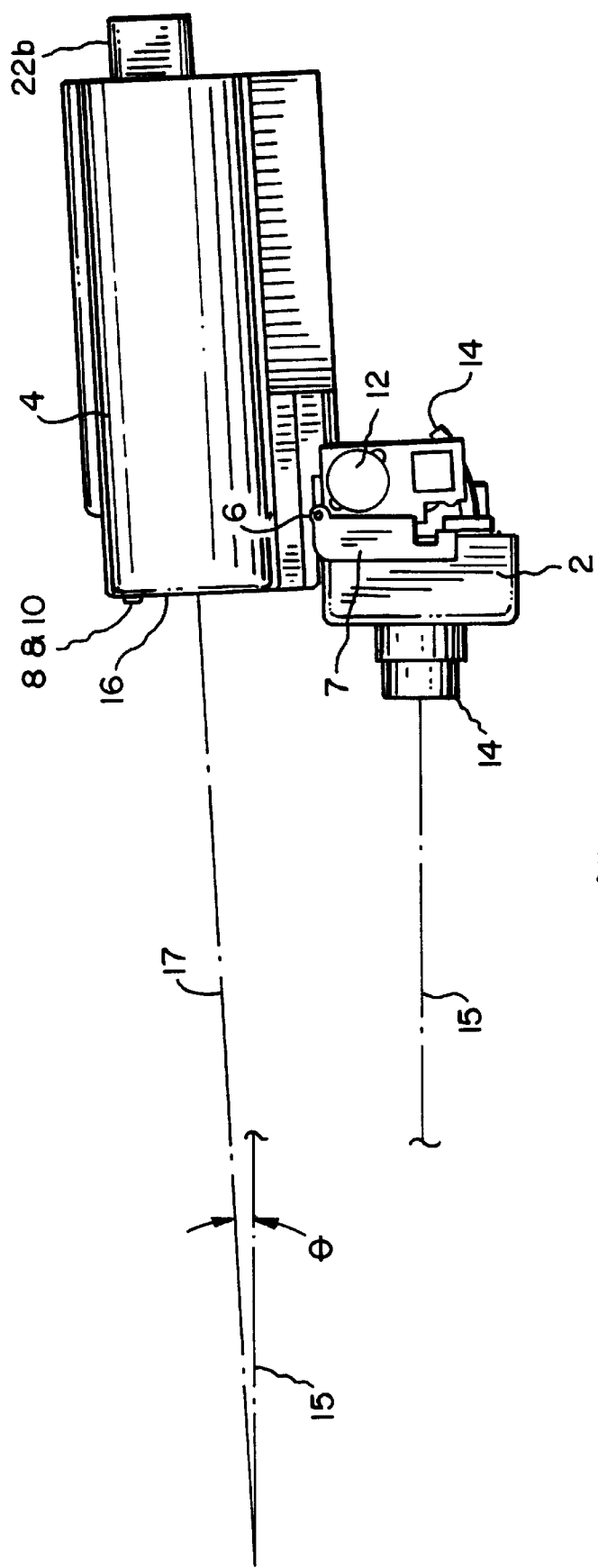
FIGS. 3 and 4 are side elevation views of the capture system of FIG. 1, showing the system oriented for capturing relative near, and relatively far, objects in a scene.
Figure 4:
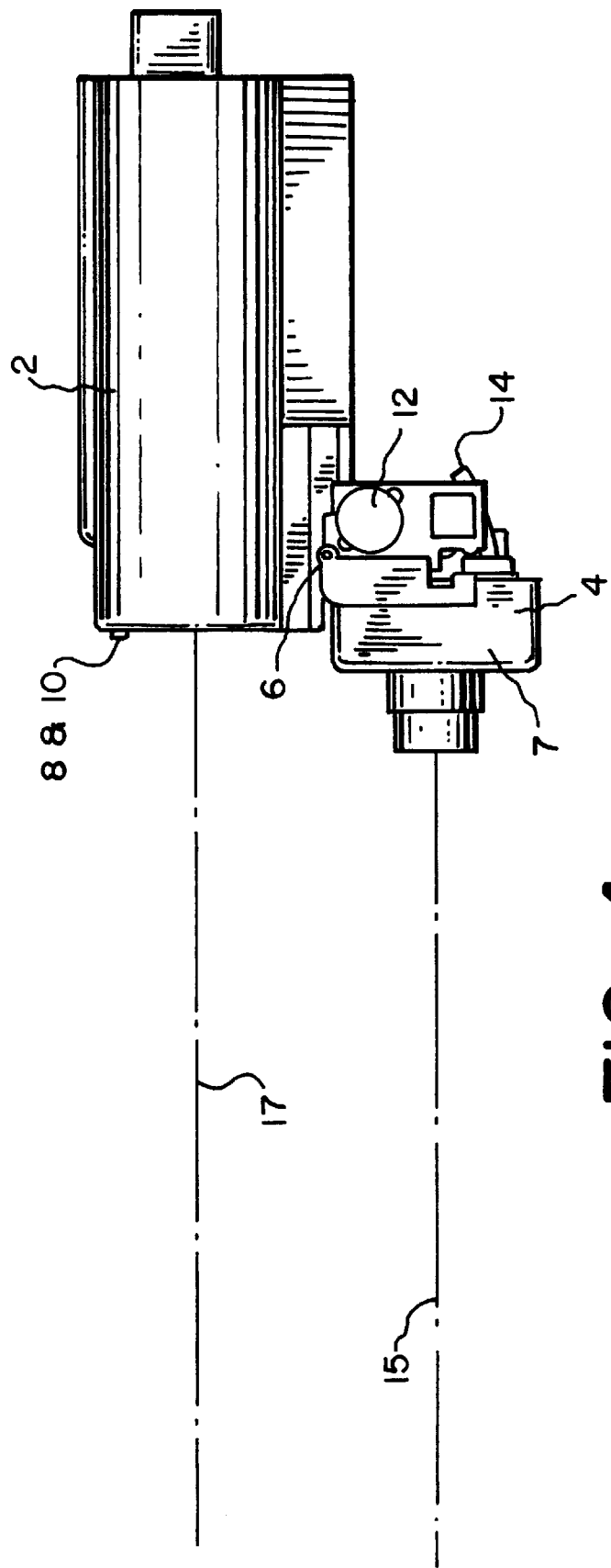
Figure 5:
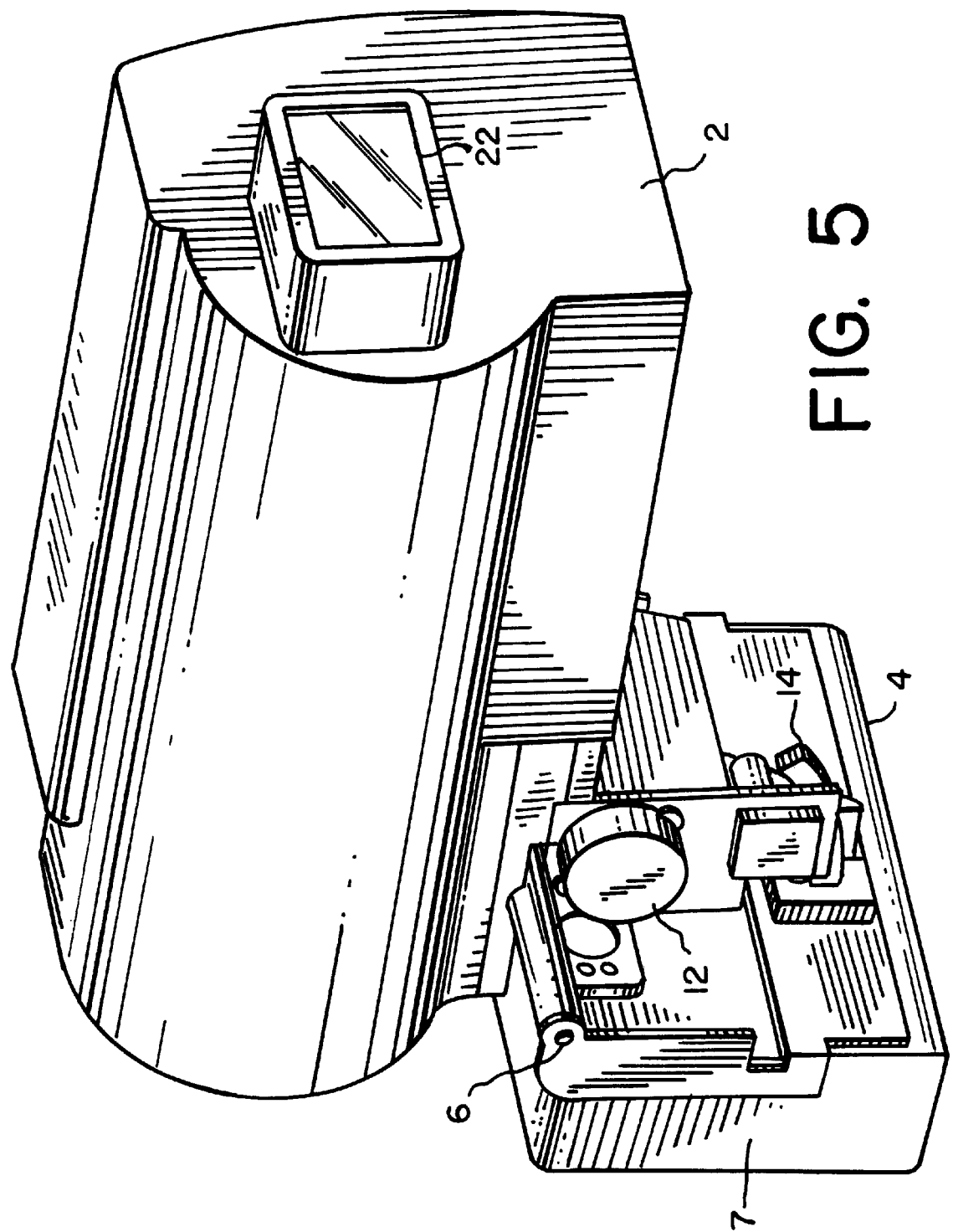
FIGS. 5 and 6 are rear perspective and rear elevation views, respectively, of the capture system of FIG. 1.

If the still camera (2) is rotated in a clockwise direction as viewed in FIGS. 1–4, the angle θ will be increased, and parallax will be reduced in close up images, such as illustrated in FIG. 3. On the other hand, if still camera (2) is driven counter clockwise as viewed in FIGS. 1–4 the opposite effect will occur with θ being increased for far further away images, such as illustrated in FIG. 4 for objects at infinity. It will be appreciated that the automatic parallax correction then, becomes more beneficial as the distance from the camera system to an image object to be captured, is reduced. By "automatic" correction or focus adjustment or the like, is referenced unless indicated to the contrary, that the correction or other step is carried out by one or more devices under suitable control (such as under the control of a processor system or other hardware and/or software which accomplishes the same purposes) without further human intervention.

At any time, a user can activate shutter control button 3 by pressing it, in order to capture a desired high quality still image. Due to the above sequence, objective lens 14 will be in the correct focus, and any parallax errors to the main object in the scene to be captured, will have been previously corrected. However, if the camera system has only recently been oriented onto a different scene (or the main object in the scene has recently moved), processor 40 can prevent image capture by still camera 2 upon user activation of the capture control (specifically, control button 3) until lens system 14 has been brought into focus by processor 40, and the parallax corrector 13 has completed adjustment of the angle θ to the angle determined to be correct by processor 40 for the main object in the scene. Specifically, processor 40 in this case will disable attempted activation of shutter 11 of still camera 2. The disabling can be accomplished, for example, by making control button 3 part of a switch which is closed only when pressed, and which is connected to electrically activated camera shutter 11 through processor 40. Processor 40 in this case, can disable shutter control 40 by simply not passing the switch closed signal from button 3 to shutter 11. Otherwise, processor 40 will pass the signal from control button 3 through to shutter 11 to activate (that is, briefly open) shutter 11 to make an exposure of the image seen by lens system 14 on a film in still camera 2.

It will be understood that other variations and modifications can be effected within the spirit and scope of the invention. For example, more than one processor can be used to perform the functions of processor 40. Thus, one or more processors are referenced as a processor system. Accordingly, the present invention is not limited to such specifically described embodiments.

PARTS LIST 2 still film camera
2a housing
3 shutter control button
4 motion video camera
4a single housing
6 shaft
7 common frame
8 infrared emitter
10 infrared detector
11 camera shutter
12 electric stepper motor
13 parallax corrector
14 objective lens system
15 optical axis
16 objective lens system
17 optical axis
20 idler gears
22 viewfinder
22a front end
22b eyepiece
30 first and second drives
40 microprocessor

What is claimed is:

1. A parallax corrected image capture system, comprising:
   a) a first camera and a second camera, at least one having a variable focus objective lens;
   b) a first drive to adjust the variable focus objective lens;
   c) a range finder to supply a distance signal indicating the distance from the capture system to an object in a scene to be captured;
   d) a parallax corrector to adjust the angle between an optical axis of the first camera and an optical axis of the second camera; and
   e) a processor system to control the first drive and the parallax corrector in accordance with the range finder distance signal.

2. An image capture system according to claim 1 wherein:
   the other one of the cameras also has a corresponding variable focus objective lens, the system additionally comprising a second drive to adjust the objective lens focus of the other one of the cameras; and
   wherein the processor system controls the second drive based upon the distance signal provided by the range finder.

3. An image capture system according to claim 1 wherein the angle between the optical axes is adjustable down to 0 degrees.

4. An image capture system according to claim 1 wherein one of the cameras has a user activated capture control which selects when the camera is to begin capturing an image, and wherein the processor system prevents image capture upon attempted user activation of the capture control until the adjustment of the angle between the optical axes has been completed by the parallax corrector.

5. An image capture system according to claim 1 wherein one of the cameras is a still film camera.

6. A parallax corrected image capture system, comprising:
   a) a motion video camera and a still film camera, at least one of which has a variable focus objective lens;
   b) a first drive to adjust the variable focus objective lens;
   c) a range finder to supply a distance signal indicating the distance from the capture system to an object in a scene to be captured; and
   d) a parallax corrector to adjust the angle between an optical axis of the video camera and an optical axis of the still film camera; and
   e) a processor system to control the first drive and the parallax corrector in accordance with the range finder distance signal.

7. An image capture system according to claim 6 additionally comprising:
   f) a video recorder to record a video sequence from the video camera;
   g) a user activated shutter on the still film camera which permits a user to capture on film, a still image during a portion of the sequence recorded by the video recorder.

8. An image capture system according to claim 7 wherein the processor system prevents opening of the still camera shutter until the parallax corrector has completed adjustment of the angle between the optical axes.

9. An image capture system according to claim 6 wherein each of the video and still cameras has a corresponding camera housing and an objective lens mounted on the corresponding camera housing, and wherein the parallax corrector adjusts the angle between the optical axes by adjusting the angle between the camera housings.

10. An image capture system according to claim 6 wherein the variable focus objective lens is on the video camera.

11. An image capture system according to claim 10:
    wherein the still camera has a variable focus objective lens;
    the system additionally comprises a second drive to adjust the still camera objective lens focus; and
    wherein the processor system controls the second drive based upon the distance signal provided by the range finder.

12. An image capture system according to claim 6 wherein the angle between the optical axes is adjustable down to 0 degrees.

13. A method of capturing two images of a scene, comprising:
    a) pointing first and second cameras of a capture system toward the scene;
    b) automatically adjusting the focus of a variable focus objective lens on at least one of the cameras, based on a distance signal from a range finder which indicates distance from the capture system to an object in the scene; and
    c) automatically adjusting, the angle between an optical axis of the first camera and an optical axis of the second camera based upon the distance signal obtained from the range finder.

14. A method according to claim 13 additionally comprising automatically adjusting the focus of a variable focus objective lens on the other one of the cameras, based on the distance signal from the range finder.

15. A method according to claim 13 wherein one of the cameras has a user activated capture control which selects when the camera is to begin capturing an image, the method additionally comprising preventing image capture upon attempted user activation of the capture control until adjustment of the angle between the optical axes is completed.

16. A method of capturing two images of a scene, comprising:
    a) pointing a motion video camera and a still film camera of a capture system toward the scene, at least one of which cameras has a variable focus objective lens;
    b) automatically adjusting the variable focus objective lens based on a distance signal from a range finder which indicates distance from the capture system to an object in the scene; and
    c) automatically adjusting the angle between an optical axis of one of the cameras and an optical axis of another one of the cameras based upon the distance signal obtained from the range finder.

17. A method according to claim 16 additionally comprising recording a motion video sequence from the video camera.

18. A method according to claim 16 wherein the angle between the optical axes is adjusted by adjusting the angle between respective camera housings.

19. A method according to claim 16, additionally comprising using a second drive to adjust an objective lens focus of the still camera based upon the distance signal provided by the range finder.

20. A method according to claim 16 additionally comprising preventing opening of a still camera shutter until the adjustment of the angle between the optical axes is completed.

21. A method according to claim 16 wherein the angle between the optical axes is adjusted from an angle greater than 0 degrees down to 0 degrees.

* * * * *